(12) United States Patent
Heaton et al.

(10) Patent No.: US 10,138,812 B2
(45) Date of Patent: Nov. 27, 2018

(54) GAS TURBINE ENGINE BEARING CHAMBER SEALS

(71) Applicant: ROLLS-ROYCE PLC, London (GB)

(72) Inventors: Peter Ellison Heaton, Derby (GB); Crispin David Bolgar, Nottingham (GB)

(73) Assignee: ROLLS-ROYCE plc, London (GB)

( * ) Notice: Subject to any disclaimer, the term of this patent is extended or adjusted under 35 U.S.C. 154(b) by 458 days.

(21) Appl. No.: 13/684,356

(22) Filed: Nov. 23, 2012

(65) Prior Publication Data

US 2013/0177406 A1 Jul. 11, 2013

(30) Foreign Application Priority Data

Jan. 10, 2012 (GB) .................... 1200290.3

(51) Int. Cl.
| | |
|---|---|
| *F02C 7/06* | (2006.01) |
| *F01D 25/16* | (2006.01) |
| *F02C 7/28* | (2006.01) |
| *F01D 25/18* | (2006.01) |
| *F02C 6/08* | (2006.01) |
| *F16C 33/76* | (2006.01) |
| *F01D 11/04* | (2006.01) |
| *F01D 11/06* | (2006.01) |

(52) U.S. Cl.
CPC .............. *F02C 7/06* (2013.01); *F01D 11/04* (2013.01); *F01D 11/06* (2013.01); *F01D 25/162* (2013.01); *F01D 25/183* (2013.01); *F02C 6/08* (2013.01); *F02C 7/28* (2013.01); *F16C 33/762* (2013.01); *F05D 2260/601* (2013.01)

(58) Field of Classification Search
CPC ................................ F01D 25/162; F02C 7/28
USPC .... 60/782, 785, 39.83, 786–790, 802, 39.08
See application file for complete search history.

(56) References Cited

U.S. PATENT DOCUMENTS

| | | | | |
|---|---|---|---|---|
| 2,994,785 | A | * | 8/1961 | Mespoulhes ................... 60/789 |
| 3,296,793 | A | * | 1/1967 | Davies et al. ............... 60/39.08 |
| 4,077,202 | A | * | 3/1978 | Schutze ................ B64D 41/00 |
| | | | | 60/788 |

(Continued)

FOREIGN PATENT DOCUMENTS

| | | |
|---|---|---|
| EP | 1316678 A2 | 6/2003 |
| EP | 1 520 960 A2 | 4/2005 |

(Continued)

OTHER PUBLICATIONS

May 5, 2012 British Search Report issued in Application No. GB1200290.3.

(Continued)

*Primary Examiner* — Ted Kim
(74) *Attorney, Agent, or Firm* — Oliff PLC

(57) ABSTRACT

A gas turbine engine sealing air system including a bearing chamber seal to prevent lubricant fluid loss from a fluid chamber, the sealing effected by ingress of sealing air. The system includes an air vent duct coupled to the bearing chamber seal. An ejector is located within the air vent duct to pump sealing air from the bearing chamber seal and through the air vent duct. A first duct is coupled between a starter air system of the gas turbine engine and the ejector to provide motive fluid to the ejector during gas turbine engine starting.

13 Claims, 6 Drawing Sheets

(56) References Cited

U.S. PATENT DOCUMENTS

| | | | |
|---|---|---|---|
| 5,127,220 A * | 7/1992 | Jesrai | F02C 7/26 60/778 |
| 5,363,641 A * | 11/1994 | Dixon et al. | 60/778 |
| 5,429,208 A * | 7/1995 | Largillier et al. | 60/39.08 |
| 5,611,661 A * | 3/1997 | Jenkinson | 60/39.08 |
| 6,345,954 B1 | 2/2002 | Al-Himyary et al. | |
| 7,836,675 B2 * | 11/2010 | Corattiyil et al. | 60/39.08 |
| 8,522,521 B2 * | 9/2013 | Dyer | 60/39.08 |
| 2007/0107438 A1 | 5/2007 | Morimoto et al. | |
| 2009/0120098 A1 | 5/2009 | Avila et al. | |
| 2009/0288384 A1 * | 11/2009 | Granitz et al. | 60/39.08 |
| 2012/0156005 A1 * | 6/2012 | Nielsen et al. | 415/1 |

FOREIGN PATENT DOCUMENTS

| | | |
|---|---|---|
| EP | 2 357 385 A1 | 8/2011 |
| GB | 2247510 A | 3/1992 |
| WO | 94/23184 A1 | 10/1994 |
| WO | WO 01/76348 A2 | 10/2001 |

OTHER PUBLICATIONS

Oct. 4, 2017 European Search Report issued in European Patent Application No. 12193854.2.

* cited by examiner

GAS TURBINE ENGINE BEARING CHAMBER SEALS

The present invention relates to a sealing air system for gas turbine engine seals. In particular, it relates to improvements in such systems during gas turbine engine starting.

Various seals in a gas turbine engine act to prevent oil loss from a chamber, for example of a bearing, by supply of sealing air into that chamber. Such seals are known as bearing chamber seals. This introduces a pressure differential across the bearing chamber seal which prevents egress of the oil. It is known to supply air bled from a compressor for this purpose.

One disadvantage of using compressor bleed air is that during engine starting the air pressure may be lower than that in the chamber. This means that the pressure differential across the bearing chamber seal is reversed and oil is able to leak from the chamber.

The present invention provides a sealing air system that seeks to address the aforementioned problems.

Accordingly the present invention provides a gas turbine engine sealing air system comprising: a bearing chamber seal to prevent lubricant fluid loss from a fluid chamber, the sealing effected by ingress of sealing air; an air vent duct coupled to the bearing chamber seal; a starter air system of the gas turbine engine; an ejector located within the air vent duct to pump sealing air from the bearing chamber seal and through the air vent duct; and a first duct coupled between the starter air system and the ejector to provide motive fluid to the ejector during gas turbine engine starting.

Advantageously the sealing air supply system of the present invention maintains a positive pressure drop across the bearing chamber seal at all engine conditions, particularly during starting and cranking.

The sealing air system may further comprise a second air source and a second duct coupled between the second air source and the ejector to provide the motive fluid during other periods of gas turbine engine operation. The second air source may comprise a compressor bleed of the gas turbine engine and the second duct may comprise a bleed duct.

The ejector may be configured as a restriction of the air vent duct. Alternatively the sealing air system may further comprise a restriction of the air vent duct. Such a restriction reduces the amount of lubricant drawn from the bearing chamber and therefore reduces the amount of lubricant required.

The sealing air system may further comprise an air/oil separator located in the air vent duct to reduce or eliminate oil from air expelled overboard the engine. The air/oil separator may be located between the bearing chamber seal and the ejector or may be located downstream of the ejector.

The sealing air system may further comprise a switching mechanism to switch the supply of motive fluid between the starter air system and the second air source or to stop the supply of motive fluid. The switching mechanism may be active or passive. The sealing air system may comprise a control system arranged to control the switching mechanism. The control system may be arranged to switch between the starter air system and the second air source or no motive fluid dependent on the air pressure of the starter air system. Alternatively, the control system may be arranged to switch between the starter air system and the second air source or no motive fluid dependent on the air pressure of the second air source. In a further alternative, the control system may be arranged to switch between the starter air system and the second air source or no motive fluid dependent on the relative air pressure of the starter air system and the second air source.

The sealing air system may comprise more than one bearing chamber seal each coupled to the air vent duct. The sealing air system may comprise more than one air vent duct and more than one bearing chamber seal, each bearing chamber seal coupled to one of the air vent ducts.

The starter air system may comprise a starter air turbine, a starter air valve and a starter air supply duct coupled therebetween. The first duct may be coupled to any component in the starter air system.

The sealing air system may further comprise a non-return valve in the first duct, the second duct or in each of the first and second ducts.

The first duct may be coupled between the starter air system and the ejector to supply sealing air at other periods of gas turbine engine operation.

The lubricant fluid may be oil. The motive fluid may be air. The fluid chamber may comprise a bearing.

The present invention also comprises a gas turbine engine comprising the sealing air system described.

The present invention will be more fully described by way of example with reference to the accompanying drawings, in which.

Figure 1:
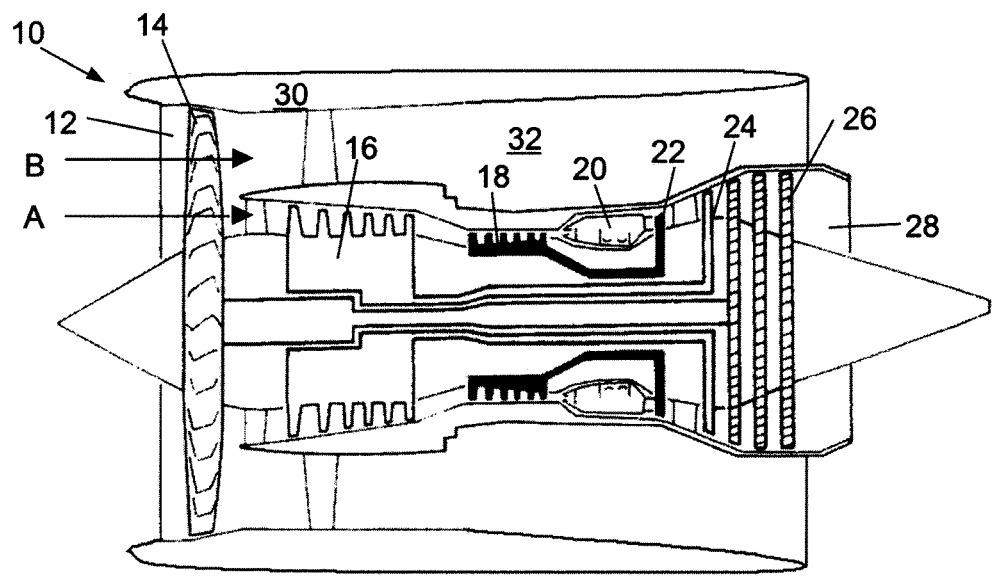
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. The gas turbine engine 10 may be used to power an aircraft, and may be one of two or more gas turbine engines 10 used to power such an aircraft.

Figure 2:
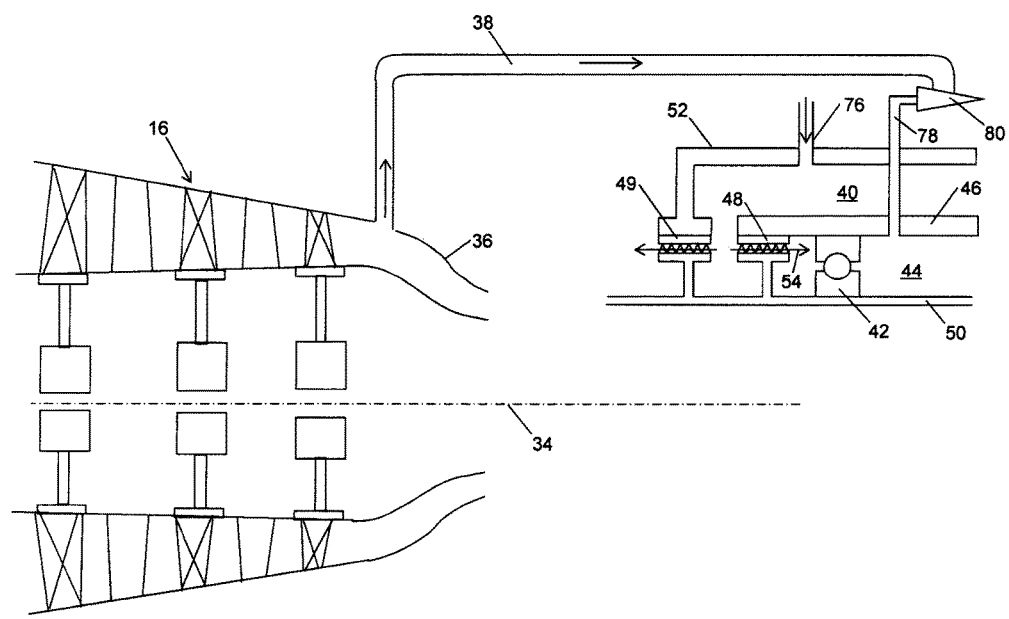
FIG. 2 is a schematic illustration of the known sealing air system.

FIG. 2 illustrates a portion of a compressor, for example the intermediate pressure compressor 16, of the gas turbine engine 10 which rotates about the engine's centre line 34. The core airflow A is directed through the compressor duct 36 towards the combustor 20 and turbines 22, 24, 26. A bleed duct 38 is supplied to extract a proportion of the air from the compressor duct 36, for example 0.25% of the air flow. There may be a plurality of bleed ducts 38 in an annular array. Preferably the bleed ducts 38 are equi-angularly spaced.

FIG. 2 also shows an annular buffer 40. The buffer 40 surrounds a bearing 42, the bearing 42 being radially inward of the buffer 40. The bearing 42 is located within a bearing chamber 44 that comprises a mixture of air and oil or another lubricant fluid. The buffer inner wall 46 is preferably also the outer wall of the bearing chamber 44. The buffer 40 is separated from the bearing 42 and the bearing chamber 44 by a bearing chamber sealing arrangement comprised of a bearing chamber seal 48 in this arrangement. A buffer seal 49 is provided to isolate the pressure and temperature of the buffer 40 from the pressure and temperature of the intermediate pressure compressor 16 and other proximal zones of the engine 10. The bearing chamber seal 48 and buffer seal 49 typically comprises a labyrinth seal or other compliant seal to accommodate relative movement between the rotating element 50 to which the bearing chamber seal 48 and buffer seal 49 are attached and the buffer inner wall 46 and buffer outer wall 52 against which the bearing chamber seal 48 and buffer seal 49 respectively seal.

During normal operation of the gas turbine engine 10 air is fed to the buffer 40 through sealing air supply duct 76, which is coupled to a suitable sealing air source. A small amount of sealing air is forced through the bearing chamber seal 48, as shown by arrow 54, due to the pressure differential between the buffer 40 and the bearing chamber 44. This sealing air flow 54 prevents the lubricant fluid from being lost from the bearing chamber 44 into the buffer 40, where it would contaminate the air. A small amount of sealing air is also forced through the buffer seal 49.

An air vent duct 78 is provided to vent the bearing chamber 44. During some normal engine running conditions, such as idle, pullback and transient phases, the bleed duct 38 is coupled to the air vent duct 78 at an ejector 80 so that the bleed duct 38 provides the motive fluid for the ejector 80. The ejector 80 works in conventional manner to reduce the pressure in the air vent duct 78 so that sealing air is sucked through the bearing chamber seal 48 to create sealing air flow 54. During other normal engine running conditions the ejector 80 may not be fed, in which case a valve (not shown) is provided to prevent air from the bleed duct 38 reaching the ejector 80.

The present invention comprises many of the same features, each of which has the same reference numeral. The sealing air system 100 of the present invention is described with respect to FIG. 3 for engine starting conditions. The gas turbine engine 10 also comprises a starter air system 56 as known in the art. The starter air system 56 comprises an air turbine starter 58, a starter air valve 60 and a starter air supply duct 62 therebetween. To start the gas turbine engine 10 the starter air valve 60 is supplied with relatively high pressure air from a source, such as a ground cart, an auxiliary power unit of the aircraft or another gas turbine engine 10. The starter air valve 60 is opened to allow the air to flow through the starter air supply duct 62 to the air turbine starter 58 which is drivingly coupled to one or more of the shafts of the gas turbine engine 10 in order to crank the gas turbine engine 10.

Figure 3:
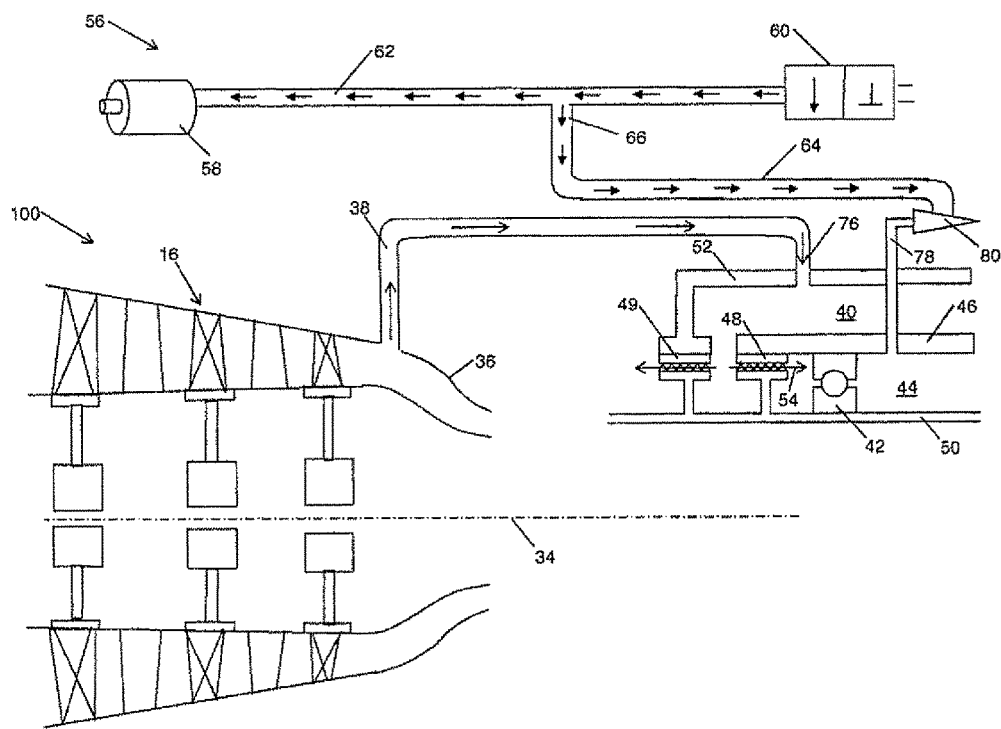
FIG. 3 is a schematic illustration of a sealing air system in an engine starting configuration according to the present invention.

In the sealing air system 100 of the present invention the bleed duct 38 is coupled to the sealing air supply duct 76 so that air bled from the intermediate pressure compressor 16 is supplied to the buffer 40 and thence to the bearing chamber seal 48. During starting of the gas turbine engine 10 the pressure in the intermediate pressure compressor 16 is low and so the air supplied to the buffer 40 may be at a lower pressure than the pressure within the bearing chamber 44. A first duct 66 is provided that couples between the starter air system 56 and an air supply duct 64. As shown in FIG. 3 the first duct 66 is a tapping from the starter air supply duct 62. During starting, air is supplied from the starter air system 56 through the first duct 66 and the air supply duct 64 to the ejector 80 to provide the motive fluid for the ejector 80 in the air vent duct 78. The air from the starter air system 56 is at a higher pressure than the air available from the intermediate pressure compressor 16 and therefore acts to reduce the pressure in the air vent duct 78 and thus to maintain the positive pressure differential across the bearing chamber seal 48 by sucking air through it. Thus the sealing air system 100 of the present invention overcomes the problem of the known system during starting by sourcing the motive fluid for the ejector 80 from the starter air system 56 which is at higher pressure than the intermediate pressure compressor 16 or elsewhere in the core of the gas turbine engine 10.

Once the starting phase is complete, the air supplied to the buffer 40 has a sufficiently high pressure to maintain the positive pressure differential across the bearing chamber seal 48. The starter air system 56 is stopped during other engine phases, typically by shutting off the starter air valve 60, so no air is supplied to the ejector 80 as motive fluid. Optionally air may be supplied to the ejector 80 during other engine conditions such as flight idle.

Figure 4:
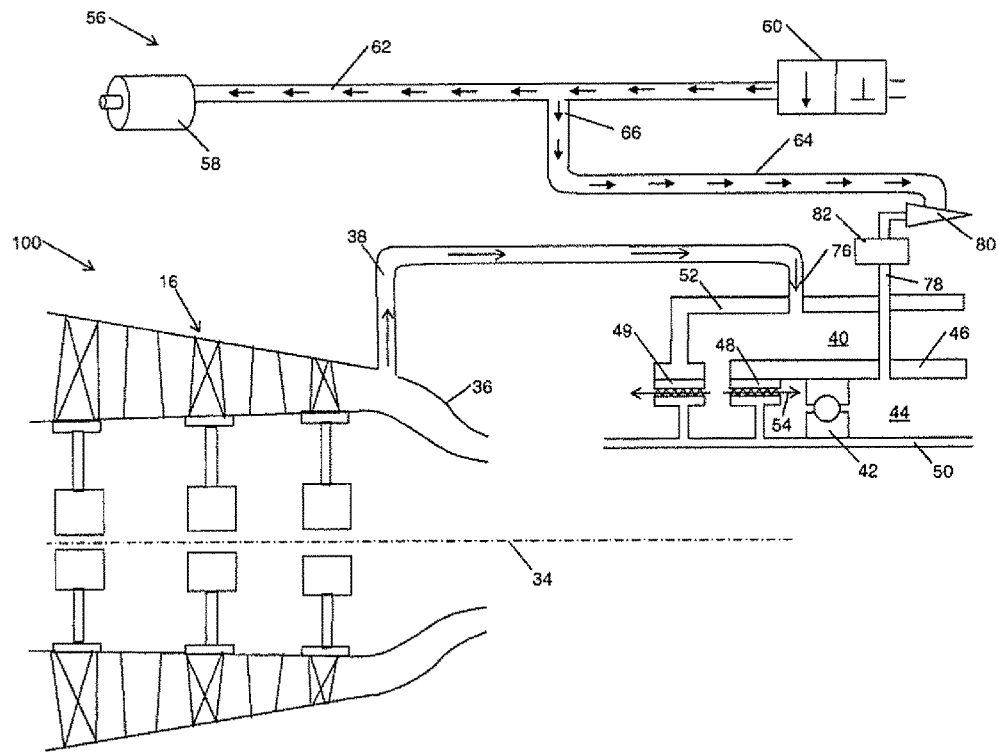
FIGS. 4 to 6 are schematic illustrations of other sealing air systems in an engine starting configuration according to the present invention.

FIG. 4 shows the air supply system 100 of the present invention in the starting configuration with an additional, optional component. An air/oil separator 82 is provided in the air vent duct 78 before the ejector 80. This air/oil separator 82 may take any appropriate form and acts to remove the oil entrained in the air flow so that the fluid that is exhausted from the ejector 80 is clean air. This is beneficial because the exhaust fluid is often exhausted overboard when the gas turbine engine 10 is used to power an aircraft. If the fluid includes entrained oil this can be visible to customers and passengers, and may cause staining on the surface of the aircraft which may cause unwarranted dismay.

Figure 5:
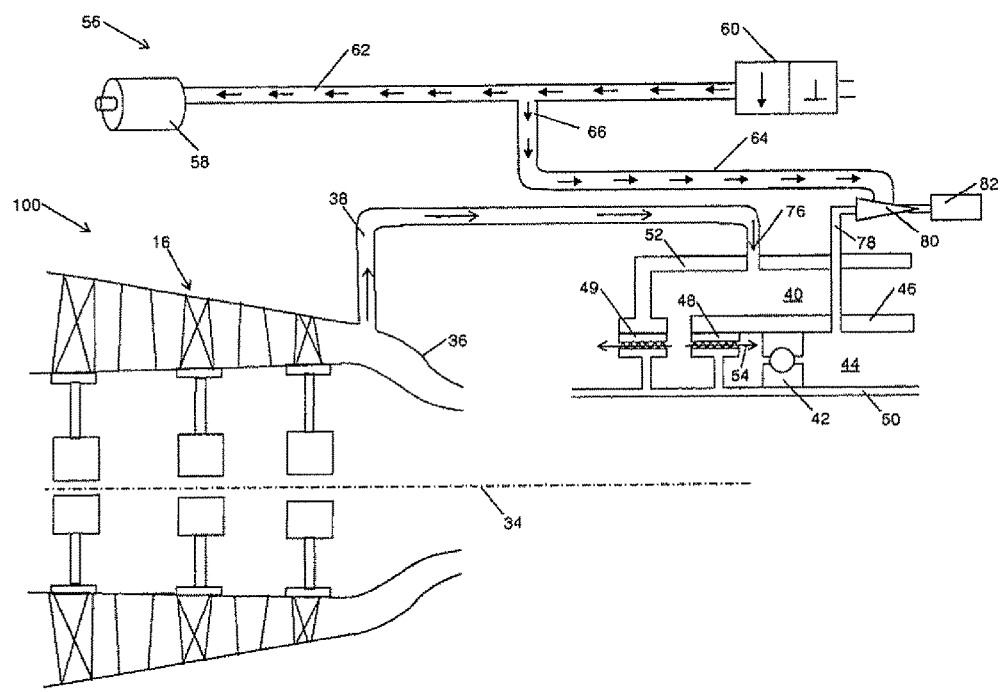

FIG. 5 shows an alternative arrangement to FIG. 4 in which the air/oil separator 82 is located after the ejector 80 but before the fluid is exhausted overboard.

Figure 6:
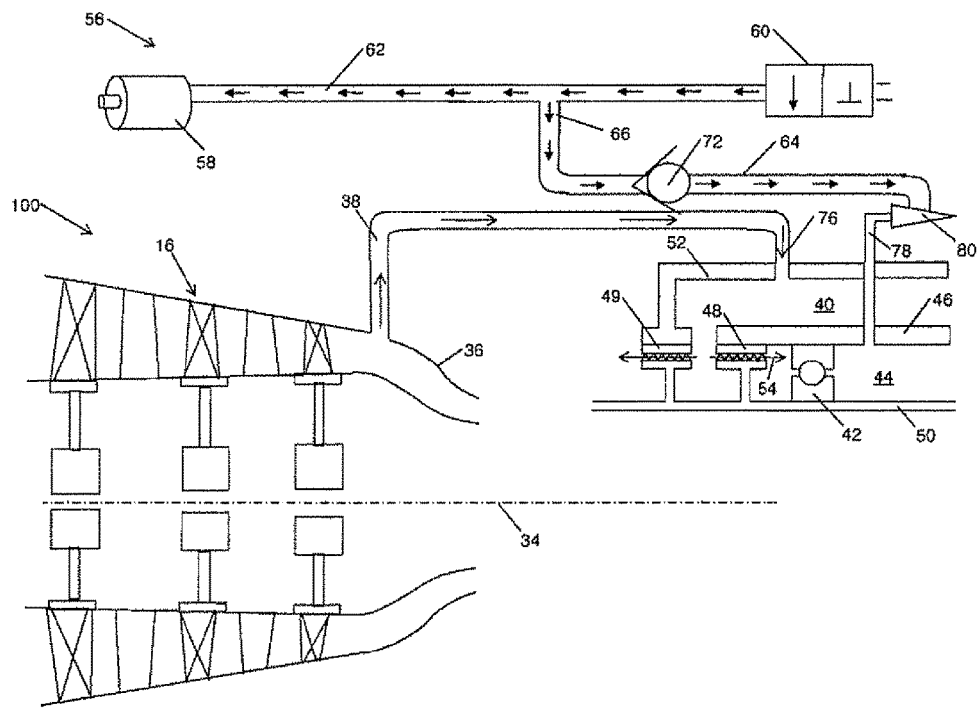

FIG. 6 shows a further arrangement of the air supply system 100 of the present invention in the starting configuration. A first non-return valve 72 is located in the air supply duct 64. This acts to prevent air from flowing back into the starter air system 56 during normal engine running. This is a passive mechanism because it is the pressure in the starter air system 56, or the relative pressure between that and the air vent duct 78, that determines whether starter air flows through the air supply duct 64 to the ejector 80.

Each of FIGS. 3 to 6 is illustrated in the engine starting configuration. It will be understood that in the engine running configuration, no air flow is provided to the ejector 80 because sufficient pressure differential is generated across the bearing chamber seal 48 by the air pressure supplied to the buffer 40. The engine running configuration has therefore not been illustrated.

Figure 7:
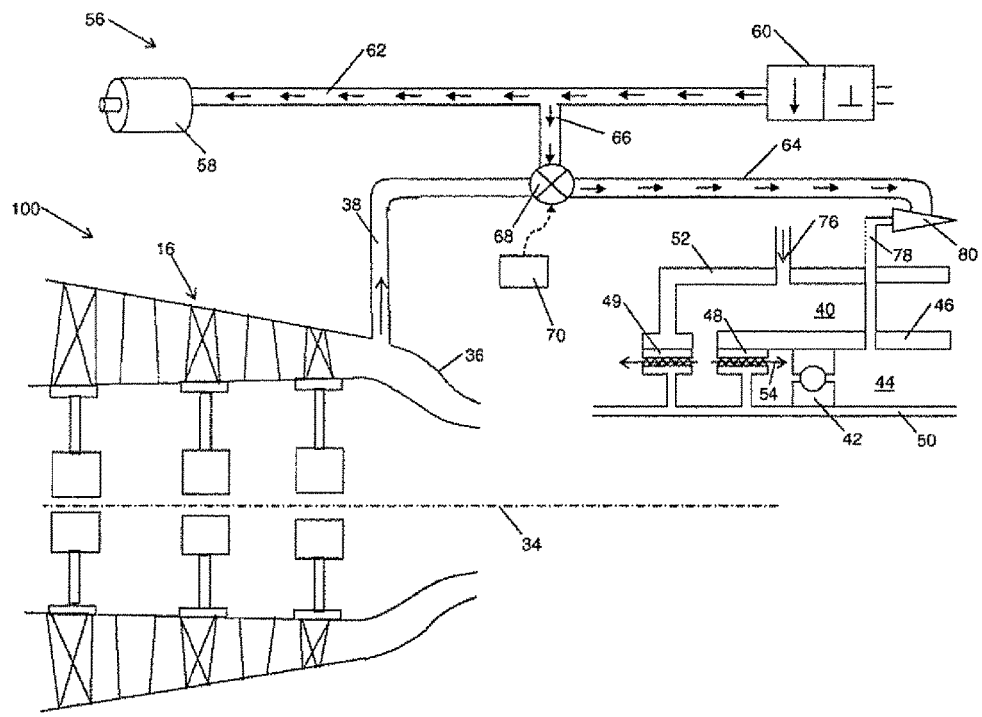
FIG. 7 is a schematic illustration of a sealing air system in an engine starting configuration according to the present invention.

In the arrangement shown in FIG. 7, the bleed duct 38, air supply duct 64 and first duct 66 meet at a switching mechanism 68 so that the bleed air may be supplied as the motive fluid to the ejector 80 at some engine conditions. The connection between the bleed duct 38 and the sealing air supply duct 76 has been omitted from FIG. 7 for clarity only. The switching mechanism is arranged to switch supply to the air supply duct 64 between the starter air system 56 using the first duct 66 and the intermediate pressure compressor 16 using the bleed duct 38 or to close off both paths. Optionally there may also be a control system 70 arranged to control the switching mechanism 68. The control system 70 may exert active or passive control. The control system 70 may form part of the engine electronic controller, another extant controller or may be a separate control unit or control function.

During gas turbine engine starting, the switching mechanism 68 is arranged to open a flow path between the first duct 66 and the air supply duct 64 so that the ejector 80 is supplied with air from the starter air system 56 of the gas turbine engine 10 as the motive fluid. This air is at relatively high pressure and so causes the sealing air to be drawn through the bearing chamber seal 48 and thence into the air vent duct 78 to prevent egress of the lubricant fluid.

Figure 8:
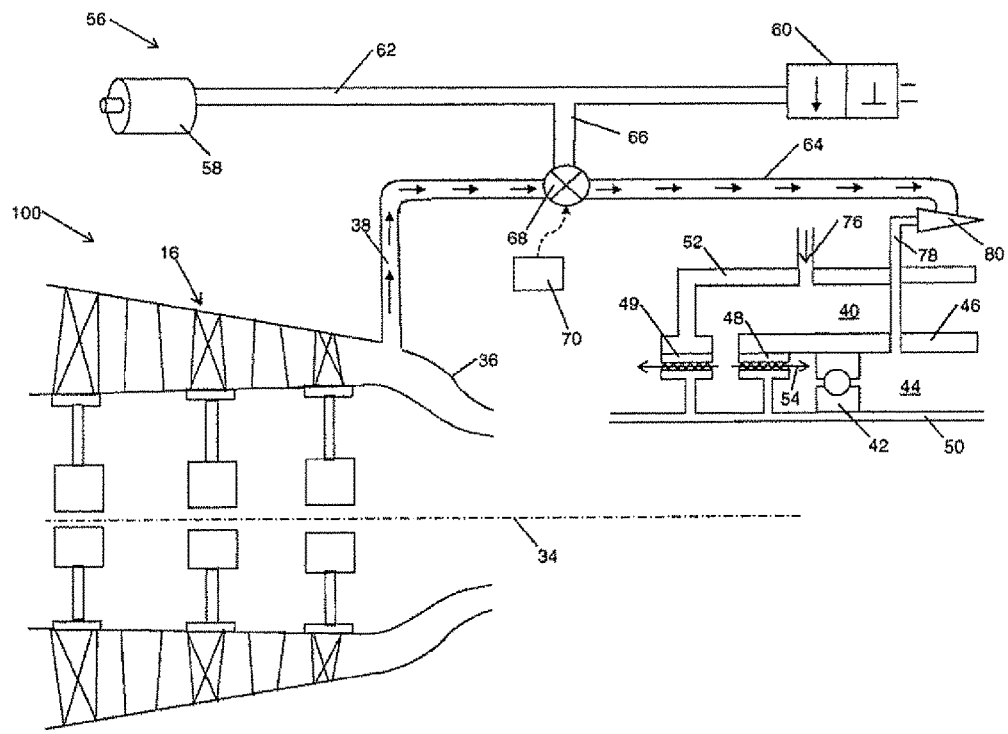
FIG. 8 is a schematic illustration of a sealing air system in an engine running configuration according to the present invention.

FIG. 8 shows the sealing air system 100 of the present invention during other engine conditions than starting, collectively "engine running". In these conditions the air bled from the intermediate pressure compressor 16 is of sufficient pressure to act effectively as the motive fluid for the ejector 80. The starter air system 56 may also be switched off so no air is available therefrom. Therefore, the switching mechanism 68 is arranged to close the flow path between the first duct 66 and the air supply duct 64 and open, instead, a flow path between a second duct, the bleed duct 38, and the air supply duct 64. In this arrangement the sealing air system 100 acts in the same manner as the known arrangement discussed with respect to FIG. 2.

During other engine conditions no motive fluid is required for the ejector 80. At these conditions, the switching mechanism 68 acts to close both flow paths to the air supply duct 64.

It is important that the switching mechanism 68 closes off the flow path that is not in use so that air is not fed into the back of the intermediate pressure compressor 16 during engine starting. This prevents the gas turbine engine 10 surging and/or stalling during start or experiencing other disadvantageous effects. Similarly, it is important to close off the other flow path during engine running so that air is not fed back into the starter air system 56 which may contaminate the air, or cause other disadvantageous effects to the starter system. This air may be used to supply air to the aircraft cabin in some applications.

Beneficially the ejector 80 also functions as a restriction in the air vent duct 78. This enables the flow through the bearing chamber seal 48 to be reduced so that less oil is entrained from the bearing chamber 44 during engine running. This in turn means that the air/oil separator 82 has less work to do, and the oil system can function with less oil as a greater proportion of it will be in the bearing chamber 44 as intended.

Figure 9:
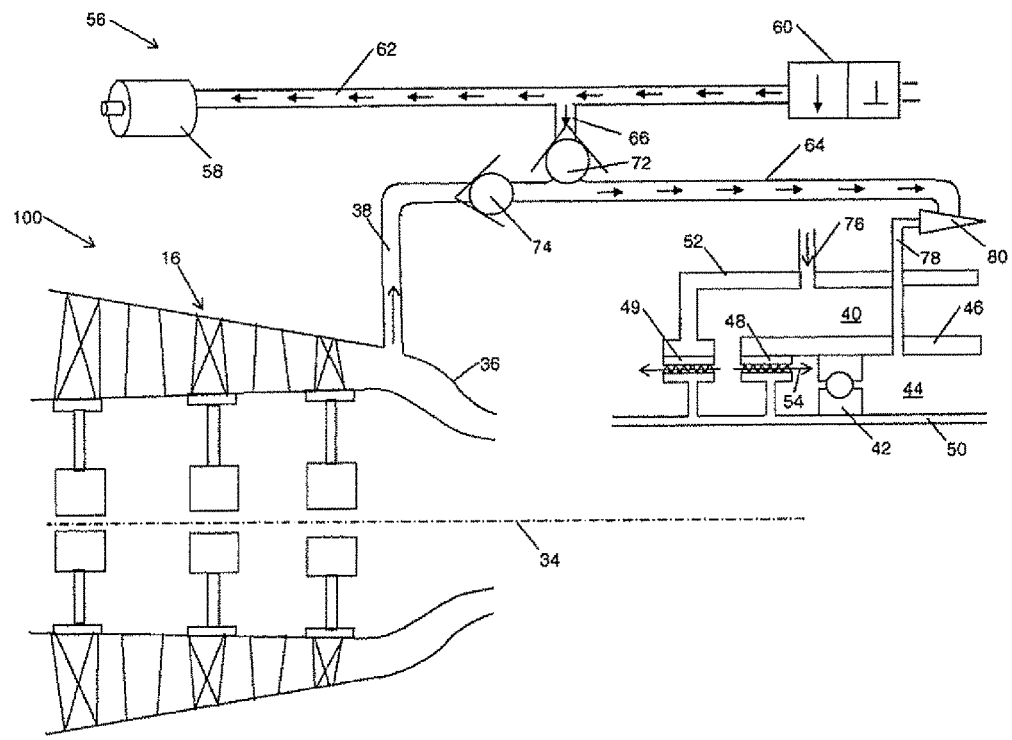
FIG. 9 is a schematic illustration of another sealing air system in an engine starting configuration according to the present invention.

FIG. 9 shows a further arrangement of the sealing air system 100 of the present invention in the starting configuration with a different arrangement of switching mechanism 68 to FIG. 7. This is an example of a passive switching mechanism 68 which comprises the first non-return valve 72 located in the first duct 66 to prevent air from flowing back into the starter air system 56 during normal engine running. A second non-return valve 74 is located within the bleed duct 38. This acts to prevent air from flowing into the back of the intermediate pressure compressor 16, particularly when the pressure from the starter air system 56 is higher than the pressure of the intermediate pressure compressor 16, during engine starting. This is a passive switching mechanism because it is the pressure in the intermediate pressure compressor 16, or the relative pressure between that and the starter air system 56, that determines which air source supplies the air supply duct 64 when the ejector 80 requires motive fluid to ensure a positive pressure differential across the bearing chamber seal 48. It will be understood that the bleed duct 38 will also include a valve (not shown) to close off the flow path to the ejector 80 for periods of engine running when the ejector 80 is not required.

The sealing air system 100 of the present invention as described with respect to any of FIGS. 7 to 9 may optionally comprise the first duct 66 coupled between the starter air valve 60 and the air supply duct 64 via the switching mechanism 68, whether active or passive. Thus the first duct 66 inlet comprises a second outlet of the starter air valve 60 instead of a tapping from the starter air supply duct 62. This arrangement allows better control of the relative proportions of starter air directed to the air turbine starter 58 and the bearing chamber seal 48 at the expense of additional ducting.

The following modifications and variations can be applied to any of the arrangements described and illustrated herein. Although the sealing air system 100 of the present invention has been described for use during engine starting, it may also be used during other engine phases. For example, for a gas turbine engine 10 used to power an aircraft the starter air system 56 may supply the ejector 80 during descent idle when it is desirable to run the gas turbine engine 10 at low power but this results in too low pressure in the intermediate pressure compressor 16 to satisfactorily prevent lubricant fluid egress from the bearings 42.

Figure 10:
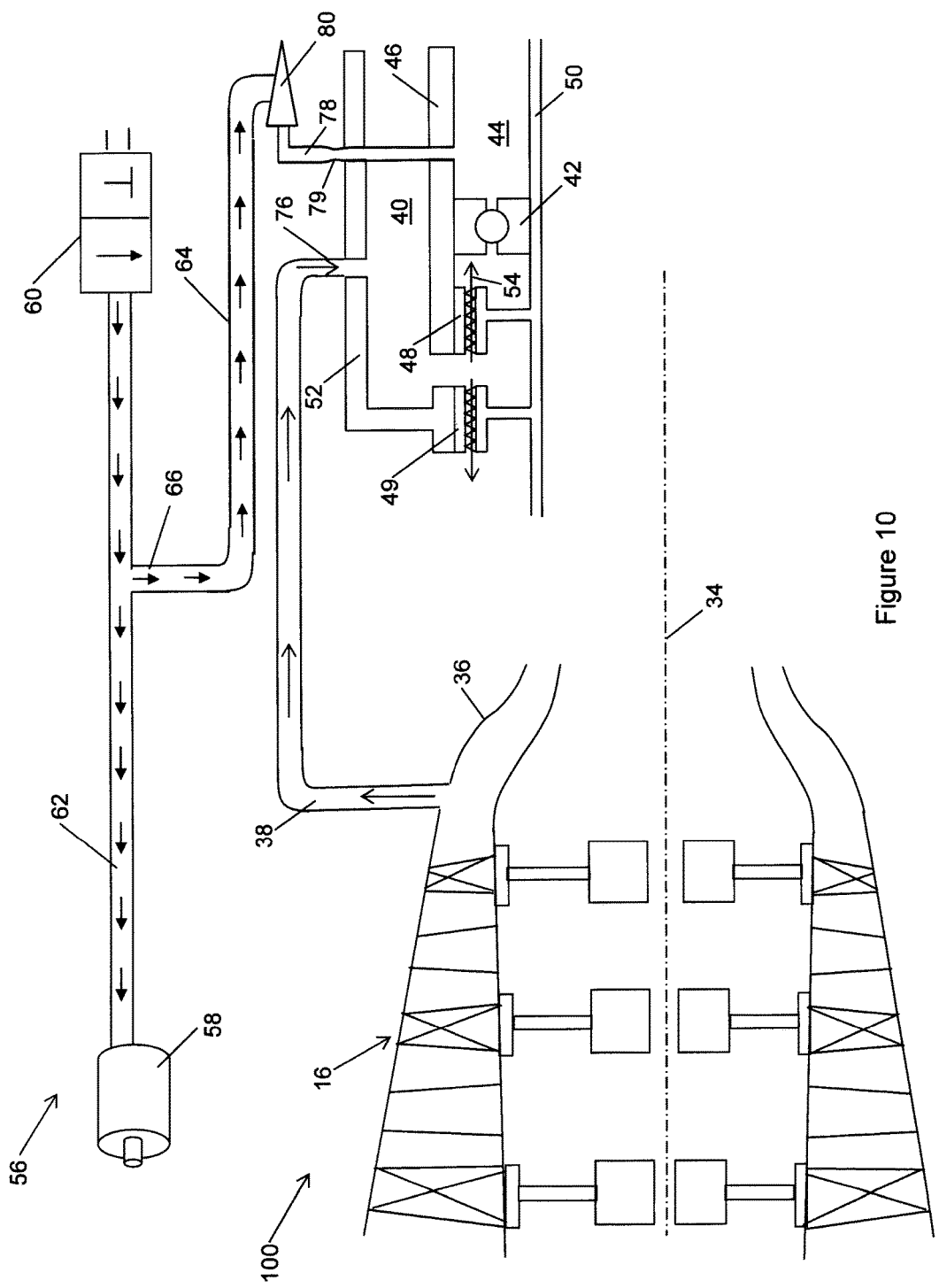
FIG. 10 is a schematic illustration of another sealing air system in an engine staring configuration according to the present invention.

The ejector 80 has been described as having the additional function of a restriction in the air vent duct 78. However, a restriction 79 may be provided elsewhere in the air vent duct 78 in addition to the ejector 80 For example, as shown in FIG. 10. This may allow the ejector 80 to be designed to be optimal for the pumping function for which it is provided and the restriction can be optimized to minimize excess air flow entraining more oil than is necessary to ensure good sealing of the bearing chamber seal 48.

Although the invention has been described as supplying an ejector 80 coupled to the air vent duct 78 of one bearing chamber seal 48, it may equally be used to supply an ejector 80 coupled to the air vent ducts 78 of multiple bearing chamber seals 48. In particular, there are often bearing chamber seals 48 on each side of the bearing chamber 44, the one nearer the intermediate pressure compressor 16 as illustrated and a second one downstream of the bearing 42. Typically these bearing chamber seals 48 are all fed from the buffer 40. There may be other bearings 42 in other parts of the gas turbine engine 10 that are also fluidly isolated by bearing chamber seals 48. Preferably the air vent ducts 78 from each are coupled to a manifold which then leads to an ejector 80.

Alternatively there may be one ejector 80 for each air vent duct 78, each ejector 80 coupled to the starter air system 56 and, optionally, the second air source to receive its motive fluid. In a further alternative, there may be multiple bearing chamber seals 48 each with an air vent duct 78, some of the plurality of air vent ducts 78 being coupled and supplied to an ejector 80 and others of the plurality of air vent ducts 78 being coupled and supplied to another ejector 80. Each of these ejectors 80 is then supplied with motive fluid via the air supply duct 64. In each of these arrangements there may be one air/oil separator 82 or there may be an air/oil separator 82 for each ejector 80. The air/oil separator or separators 82 may be located before or after the ejector or ejectors 80 in the air vent duct or ducts 78.

Although the second air source has been described as a compressor bleed from the intermediate pressure compressor 16, other sources are within the scope of the present invention. The second air source may be a compressor bleed from the high pressure compressor 18, or from the bypass duct 32. A compressor bleed may be tapped from an intermediate position axially along the compressor and not at the back end where air is delivered to the next component in the gas path through the gas turbine engine 10. There may be multiple second air sources, for example from the intermediate pressure compressor 16 and from the high pressure compressor 18.

In some applications of the present invention, no buffer 40 is provided. Instead, sealing air is supplied directly from the source to the bearing chamber seal 48. There may be an intermediate chamber which performs other functions in addition to buffering. Thus a chamber may act as buffer 40 but also have other functions. In this arrangement the buffer seal 49 is also omitted.

Other types of chamber 44 may be sealed using the sealing air system 100 of the present invention. For example, a gearbox or oil tank may be ventilated using a bearing chamber seal 48. The gearbox or oil tank therefore includes an air vent duct 78 coupled to an ejector 80 which is supplied with motive fluid from the air supply duct 64 in accordance with the present invention. Other types of switching mechanism 68 and ducts are within the scope of the present invention. The switching may be controlled on the basis of any parameter from which pressure can be inferred, although it is not necessary to calculate pressure if the relationship between pressure and the other parameter is known. Examples of such parameters include mass flow, temperature, shaft speed, throttle position, variable geometry position, inlet conditions or a combination of these.

The sealing air system 100 of the present invention has been described with particular reference to a gas turbine engine 10 used to power an aircraft. However, it is equally applicable to any gas turbine engine 10 used for other purposes including marine and industrial gas turbine engines. It also finds application in wind turbines and tidal turbines. Although the lubricant fluid is generally oil it may be other lubricants, especially in other applications.

The sealing air system 100 of the present invention can be retro-fitted to existing gas turbine engines 10 with some modifications. Thus existing gas turbine engines 10 can obtain the advantages of the present invention with some investment. There is little impact on the starter air system 56 as the ejector 80 will draw up to 20% of starter air during starting, which is not detrimental to the starting functionality.

The invention claimed is:

1. A gas turbine engine sealing air system comprising:
   a bearing chamber seal to prevent lubricant fluid loss from a fluid chamber, the sealing effected by ingress of sealing air;
   an air vent duct coupled to the bearing chamber seal;
   a starter air system of the gas turbine engine;
      wherein the starter air system comprises a starter air turbine, a starter air valve and a starter air supply duct coupled therebetween,
   a compressor of the gas turbine engine, the compressor being coupled to the sealing air system;
   an ejector located within the air vent duct to pump sealing air from the bearing chamber seal and through the air vent duct; and
   a first duct coupled between the starter air system and the ejector to provide motive fluid to the ejector during gas turbine engine starting, wherein
      air from the starter air system is at a higher pressure than air available from the compressor during gas turbine engine starting,
      the first duct is coupled only to the starter air supply duct and the ejector, and
      the air supply duct is coupled only to the starter air turbine, the starter air valve and the first duct.

2. The sealing air system as claimed in claim 1 wherein the ejector is configured as a restriction of the air vent duct.

3. The sealing air system as claimed in claim 1 further comprising a restriction of the air vent duct.

4. The sealing air system as claimed in claim 1 further comprising an air/oil separator located in the air vent duct.

5. The sealing air system as claimed in claim 4 wherein the air/oil separator is located between the bearing chamber seal and the ejector.

6. The sealing air system as claimed in claim 1 comprising more than one bearing chamber seal each coupled to the air vent duct.

7. The sealing air system as claimed in claim 1 comprising more than one air vent duct and more than one bearing chamber seal, each bearing chamber seal coupled to one of the air vent ducts.

8. The sealing air system as claimed in claim 1 further comprising a non-return valve in the first duct.

9. The sealing air system as claimed in claim 1 wherein the first duct is coupled between the starter air system and the ejector to supply sealing air at other periods of gas turbine engine operation.

10. The sealing air system as claimed in claim 1 wherein the lubricant fluid is oil.

11. The sealing air system as claimed in claim 1 wherein the motive fluid is air.

12. The sealing air system as claimed in claim 1 wherein the fluid chamber comprises a bearing.

13. The gas turbine engine comprising a sealing air system as claimed in claim 1.

* * * * *